United States Patent [19]

Yamaoka

[11] 4,067,553
[45] Jan. 10, 1978

[54] CONTINUOUS KNEADER

[76] Inventor: Kishihiro Yamaoka, No. 1-33-104, Nakamiya-Kita, Hirakata, Osaka, Japan

[21] Appl. No.: 742,728

[22] Filed: Nov. 17, 1976

[30] Foreign Application Priority Data

Nov. 25, 1975 Japan .............................. 50-141498

[51] Int. Cl.² .............................................. B29B 1/06
[52] U.S. Cl. ...................................... 366/82; 366/147
[58] Field of Search .................. 259/191, 192, 193, 7, 259/8, 9, 10, 22–26, 42–46, 185; 425/207, 208

[56] References Cited

U.S. PATENT DOCUMENTS

| 2,705,131 | 3/1955 | Ross | 259/DIG. 30 |
| 3,638,673 | 2/1972 | Stanciu | 425/207 |
| 3,676,035 | 7/1972 | Eckhardt | 425/208 |
| 3,845,938 | 11/1974 | Schold | 259/8 |
| 3,940,115 | 2/1976 | Zipperer | 259/7 |

*Primary Examiner*—Robert W. Jenkins
*Attorney, Agent, or Firm*—Frank J. Jordan

[57] ABSTRACT

A continuous kneader includes a screw shaft rotatable within a cylinder, and rotatable disks fixedly mounted on the shaft for rotation therewith. Stationary disks are arranged in face-to-face opposed relation to the rotatable disks. Each of the opposed surfaces of the disks is formed with alternating ridges and furrows. The material is passed between the opposed disk surfaces while being subjected alternately to compressive and shearing forces. Grooves are formed in the inner peripheral surface of the stationary disk and a screw section is carried on the adjacent outer peripheral surface of the drive shaft to promote the axial advance of the material through the device.

8 Claims, 13 Drawing Figures

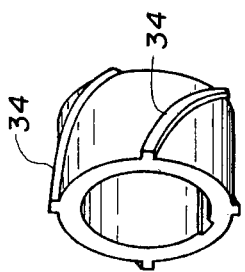
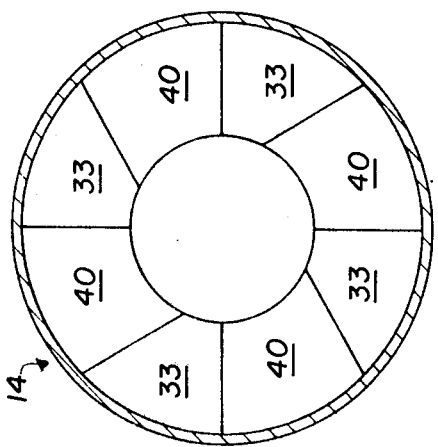
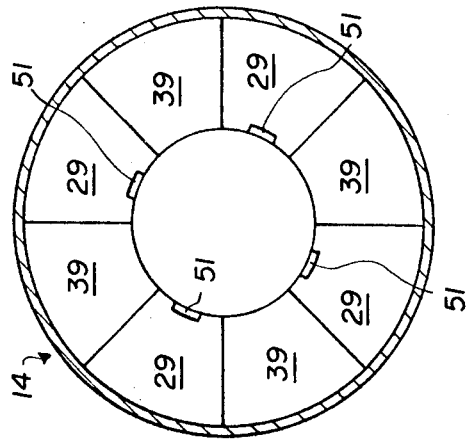
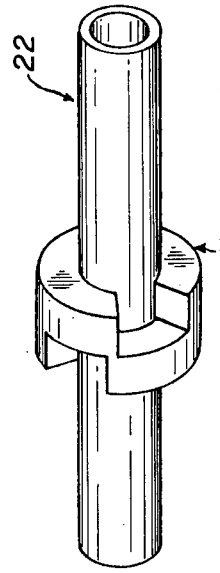
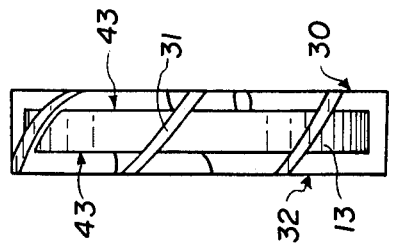
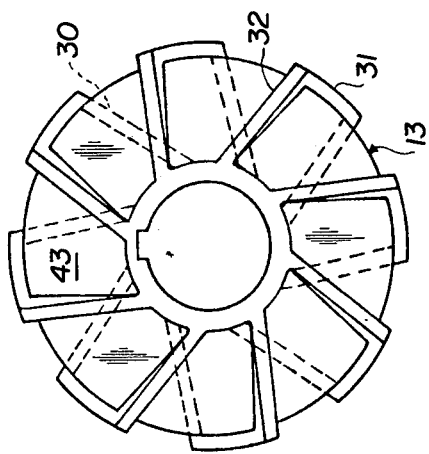

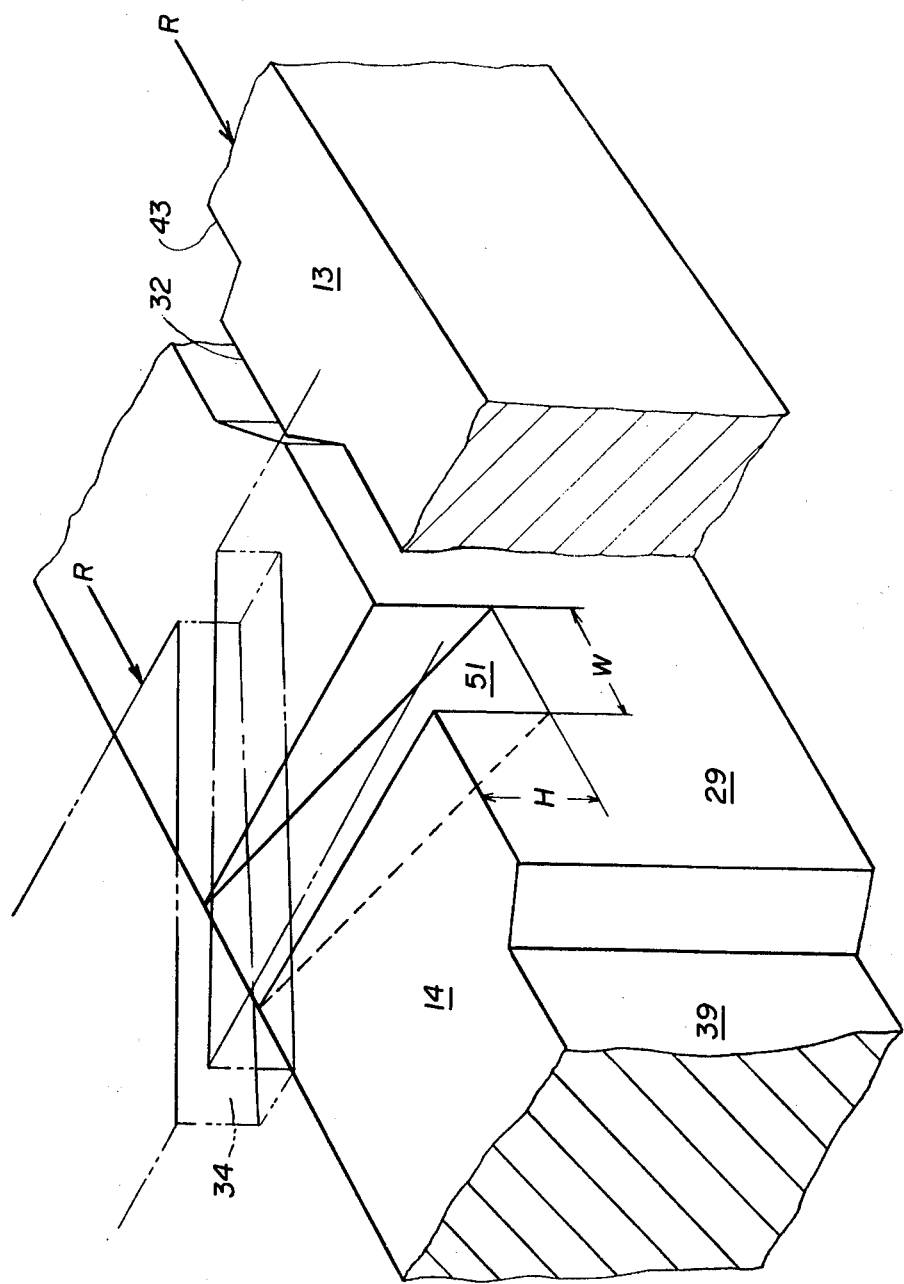

CONTINUOUS KNEADER

This invention relates to a continuous kneader for carrying out a highly efficient kneading operation by imparting alternate shearing and compression forces to the material. The present apparatus is capable of efficiently conducting not only a kneading operation for plasticized solid rubber but also a mixing and dispersing operation for liquid rubber (latex) and carbon black which is considered impossible with conventional continuous kneaders. Furthermore, the apparatus assures a continuous efficient operation for the preparation of mixtures of various plasticized polymers and fillers, dispersion of coloring agents, preparation of coating compositions from vehicles, pigments and other ingredients involving mixing, wetting, dispersing, pulverizing and like procedures, and preparation of food products such as chocolate wherein a mixture of cocoa, sugar, milk powder, etc. is pulverized to obtain a uniform dispersion.

Conventionally, the mixing and dispersing operation for the preparation of colloidal emulsions is conducted only by roll mills, sand mills or kneaders of the batch type, since continuou kneaders heretofore available are unable to effectively perform such operation. For the preparation of adhesive compositions of the rubber type, for example, chips of base rubber are swollen with solvent to obtain a colloidal mass, to which additional solvent is added. The mixture is then treated in a batch kneader for a long period of time at a controlled temperature to obtain a uniform dispersion. However, the batchwise treatment is inefficient and the quality of the resulting product varies from batch to batch.

The kneading operation is effected by a high shearing force and a flow caused by compression. When rubber is dissolved in a solvent by a kneader for the preparation of adhesive compositions, relative slippage takes place between the colloidal material and the liquid because of the construction of the blades and mixing chamber, with the result that the ingredients are kneaded only inefficiently and require a prolonged period of time for the treatment.

When such operation is carried out with the use of a homogenizing mixer, the colloidal material will be subjected to a high shearing action, whereas the low compressive action involved results in a composition in which the rubber particles have not been completely dissolved in the solvent but are present as loose particles. Accordingly, when the resulting composition is applied by a roll coater to a substrate to prepare an adhesive tape, it is not as uniformly spreadable as the composition obtained by kneaders. Thus, the mixer fails to provide satisfactory treatment.

An object of this invention is to provide an apparatus for conducting an effective kneading operation.

Another object of this invention is to provide an apparatus of compact construction for continuously conducting an efficient kneading operation.

Another object of this invention is to provide an apparatus wherein both compressive and shearing actions are effected between the opposed surfaces of rotatable disks fixedly mounted on a drive shaft and stationary disks secured to a cylinder or housing.

Still another object of this invention is to provide an apparatus in which the feed material can be advanced smoothly between the stationary disks and the drive shaft.

The apparatus of this invention comprises a drive shaft rotatable within a cylinder, at least one rotatable disk fixedly mounted on the shaft for rotation therewith, and a stationary disk opposed to the rotatable disk in face-to-face relation, such that the feed material passing between the opposed surfaces of the disks is subjected to compressive and shearing actions by the cooperation of ridges and furrows formed on the rotatable stationary disks and defining a kneading zone which assures a very efficient kneading operation. Grooves in the inner periphery of the stationary disc and a screw are provided in opposed relation to each other section on the adjacent portion of the drive shaft so that the feed can be advanced smoothly therebetween.

The above and other objects and features of this invention will become more apparent from the following detailed description with reference to the accompanying drawings, in which:

FIG. 2 is a perspective view showing a partition element carried within the drive shaft;

FIG. 3 is an end view showing a rotatable disk as it is seen in the direction of the arrow line III—III in FIG. 1;

FIG. 4 is a side elevation of the rotatable disc of FIG. 3;

FIG. 5 is an end view showing a stationary disk as it is seen in the direction of the arrow line V—V in FIG. 1;

FIG. 6 is an end view showing a stationary disk as it is seen in the direction of the arrow line VI—VI in FIG. 1;

FIG. 7 is a front end view showing a screw section provided between the rotatable disks;

FIG. 8 is a perspective view of the screw section of FIG. 7;

FIG. 13 is a fragmentary perspective view on an enlarged scale showing the relationship between a rotatable disc an inner peripheral portion of the stationary disk and a screw section of the drive shaft and the groove in the stationary disc.

Figure 1:
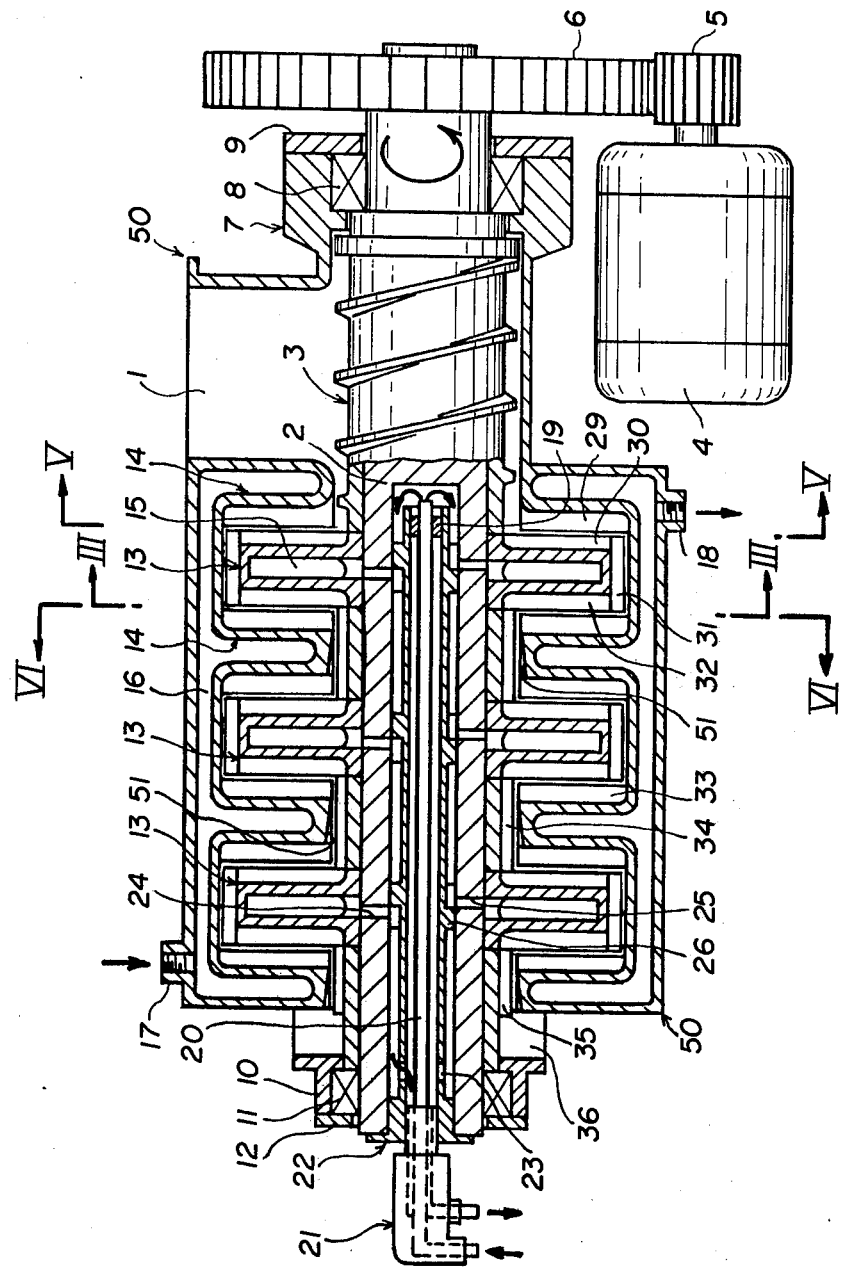
FIG. 1 is a view showing an embodiment of this invention in vertical section taken along the center line thereof.
Figure 11:
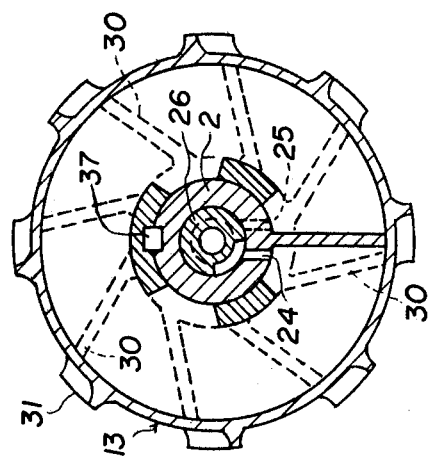
FIG. 11 is a cross sectional end view of a rotatable disk.

With reference to FIG. 1, a main drive shaft 2 is disposed rotatably within an apparatus housing or main body 50 having one end fixedly carrying a gear 6 which meshes with a pinion 5 of a motor 4. A feed screw 3 fixedly fits around the main drive shaft 2. Rotatable disks 13 are fixedly mounted on the shaft 2 at a specified spacing. The main drive shaft 2 is also fixedly provided with screw setions 34 disposed between the rotatable disks 13 and with a discharge screw section 35 at its outlet end. The main body or housing 50 has a feed inlet 1 at its one end, a feed outlet 36 at the other end therof, and stationary disks 14 positoned at its intermediate portion and opposed to the rotatable disks 13 face-to-face. The stationary disks 14 are integral with the main body 50 and define a jacket 16 along with the outer wall of the main body 50. The jacket 16 has an inlet 17 and an outlet 18.

Figure 12:
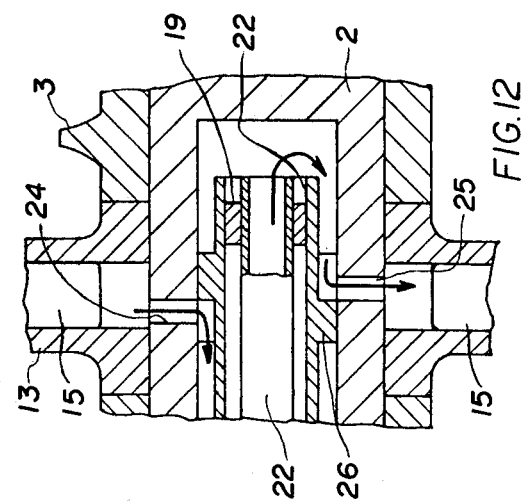
FIG. 12 is an enlarged elevational view in cross section showing the front end portion of a tube for supplying a heat to the rotatable discs medium.

The main drive shaft 2 is supported at the opposite ends of the main body 50 by bearings 8 and 11 housed in bearings cases 7 and 10 respectively. The bearings are held in the cases by holders 9 and 12. The main drive shaft 2 has a blind bore extending axially from its outlet end and accommodating an inner tube 20 for supplying a fluid heat medium or coolant and an outer tube 22. One end of the outer tube 22 is secured to the outlet end of the main drive shaft 2 by suitable means. A rotary joint 21 disposed outside the main shaft 2 is attached to one end of the inner tube 20. Each of the inner tube 20 and the outer tube 22 is open at the other end thereof. The inner tube 20 is fixedly supported by a bearing 19 within the outer tube 22, which in turn is fixedly supported by partitions 26 within the main shaft 2. As seen in FIGS. 2 and 12, the partition 26 is formed in its opposite surfaces with recesses, through which the heat medium from the inner tube 20 flows into a passage 25 in the shaft 2 and then into a jacket space 15 within the rotatable disk 13. The medium then flows through a passage 24 to the outside of the outer tube 22. After passing through the spaces 15 within disks 13, the heat medium is run off through an outlet 23 at the end of the outer tube 22.

With reference to FIGS. 3 and 4, the rotary disk 13 is formed on its opposite side surfaces with radial alternating ridges 30, 32 and furrows 43, 43. The ridges 30 on one surface are angularly out of phase with ridges 32 on the other surface, and ridges 30, 32 are integrally connected by projections 31 formed on the outer peripheral portion of the disk 13 and also constituting a screw. The ridges 30 on the surface facing the feed inlet extend toward the center of the disk with an advanced phase in the direction of rotation of the disk, whereas the ridges 32 on the other surface facing the feed outlet extend toward the center with a delayed phase with respect to the direction of rotation of the disk.

As seen in FIG. 6, one surface of the stationary disk 14 facing the feed inlet is formed with radial ridges 33 and furrows 40 arranged alternately. One of the boundaries between the ridges 33 and the furrows 40 extends radially of the disk, while the other boundary is inclined, with respect to the radial direction, in such direction that when the ridge 33 meets the ridge 32 on the opposed rotatable disk 13, the boundary will be positioned at an increased angle with the boundary defining the ridge 32. The other surface of the stationary disk 14 facing the feed outlet is formed with radial alternating ridges 29 and furrows 39, with the boundaries therebetween extending radially of the disk (see FIG. 5).

With reference to FIGS. 1, 5 and 13, the stationary disk 14 is formed in its inner peripheral surface with a suitable number of axial grooves 51 having a progressively increasing depth toward the direction of the flow of the feed.

Figure 9:
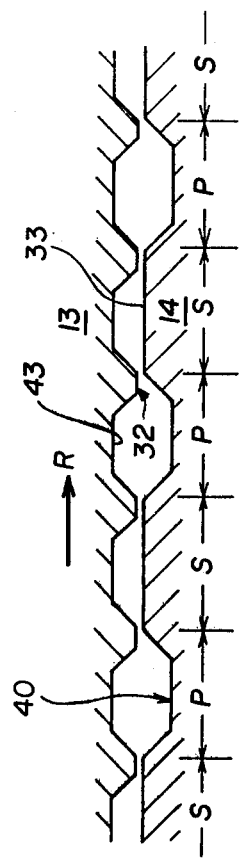
FIG. 9 is a diagram illustrating a kneading process.
Figure 10:
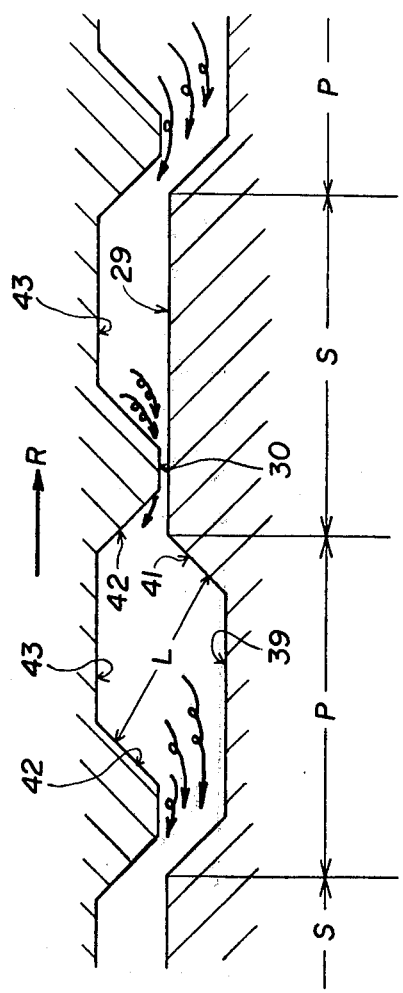
FIG. 10 is a diagram illustrating a kneading mechanism.

The apparatus operates in the following manner. First, a fluid heat medium such as steam, water or the like is passed through the jacket 16 on the main body and the jackets 15 in the rotatable disks to keep the interior of the apparatus at a specified temperature. The main drive shaft 2 is then rotated by the motor 4, and a material is fed to the inlet 1. The material is advanced leftward in FIG. 1 by the screw 3 and pushed into the furrows 43 of the rotatable disk 13 at the right end, where the material is subjected to alternate compression and shearing actions by the relative movement between the opposed surfaces of the rotatable disk 13 and the stationary disk 14. More specifically stated with reference to FIGS. 9 and 10, the clearance between the opposed surfaces is large where the furrows 43 oppose the furrows 40, and is smaller where the furrows 43 oppose the ridges 33, and is smallest between the ridges 33 and 32. Accordingly, when disk 13 rotates in the direction indicated by the arrow R, the distance L between the boundary portions 41 and 42 decreases, whereby the material therebetween is subjected to a high compressive action. The compressed material is forced out betwen the furrows 43 and the ridges 29, where it is subjected to a high shearing action. These compression and shearing actions take place similarly in the circumferential direction; in other words, compressing steps P and shearing steps S are repeated alternately in the circumferential direction. Since the ridges 30 on disk 13 of FIG. 10 are advanced in phase toward its center, the rotation of the disk 13 causes the ridges 30 to exert a circumferential force on the material while simultaneously applying a radial force thereto. Consequently, while being subjected to compressive and shearing actions in the circumferential direction, the material is forced toward the outer periphery of the disk 13, from which the material is sent to the opposite side of th disk 13 by the screw provided by the projections 31. On the opposite side, the material is also subjected to compression and shearing action in the circumferential direction in the same manner as shown in FIGS. 9 and 10. However, since the ridges 32 on the opposite side of the rotatable disk are delayed in phase toward the center of the disk with respect to the direction of rotation, the material is forced toward the center, where the material is pushed forward by the screw section 34 to a space between the next rotatable disk 13 and its adjacent stationary disk 14. The material is thereafter successively treated in the same manner as above and is finally run off from the outlet 36 by the screw section 35.

Thus, the material between the inner peripheral surface of the stationary disk 14 and outer peripheral surface of the drive shaft is advanced by the thrust of the screw section 34. When the opposed surfaces are smooth, however, th material will slip on the inner peripheral surface of the stationary disk 14, rotating with the scrw 34, and will not be efficiently advanced in the axial direction. According to this invention, such phenomenon is prevented by the axial grooves 51 formed in the inner peripheral surface of the stationary disk 14. FIG. 13 shows this construction. Part of the material pushed by the movement of the screw section 34 in the direction of the arrow R is pressed against a corner of the grooved portion 51 in the inner peripheral surface of the stationary disk 14 and forced through the groove 51 toward its outlet end having a depth H and a width W, where it is scraped off by the ridge 30 on the rotatable disk 13 and forced into a space between the opposed disk surfaces. In this way, the material is advanced effectively by the screw 34. The size and number of the grooves 51 may be suitably determined depending on the quality, composition and viscosity of the material and on the kneading operation desired.

With the present apparatus, the material is subjected to very effective shearing and compression over the entire opposed surfaces of the rotatable and stationary disks, while the material in one space between the disks is smoothly advanced to another through the grooves, whereby a very efficient kneading operation can be carried out. A suitable number of the rotatable disks are provided in accordance with the type of the material to be kneaded. Only one rotatable disk can be used for a particular kind of material. Furthermore the configuration and number of the ridges and furrows of the rotatable and stationary disks can be altered variously depending on the type and composition of the material and the desired kneading operation insofar as the foregoing operation can be conducted. In addition, a plurality of such apparatus are usable as connected together in series. Although the shearing and compressive operation is desirably conducted on the opposite faces of the rotatable disk between the stationary disks, the above operation can of course be effected only on one side of the rotatable disk. When the material to be treated is such that it will give off a gas during operation, the apparatus may be formed with a gas vent in a suitable portion.

As already described, the present apparatus is characterized in that the material is subjected to shearing and compressing operation over the entire opposed surfaces of the rotatable and stationary disks while being smoothly advanced. In this way, a wide variety of materials can be completely kneaded in the apparatus which is extremely compact in construction. Thus the apparatus is of immense value for industrial operation.

What is claimed is:

1. A continuous kneader for plasticizable materials comprising in combination:
    a housing having a feed inlet adjacent one end thereof for introduction of the material to be processed and an outlet adjacent the other end thereof for the discharge of processed material;
    a drive shaft rotably mounted within said housing having screw means thereon for axially advancing the material towards the discharge end of said housing;
    at least one rotatable disc fixedly carried by said drive shaft for rotation therewith;
    a series of generally radially-extending alternating ridges and furroughs on at least one face of said rotatable disc;
    at least one stationary disc depending from said housing in concentric relation to said drive shaft and in face-to-face spaced relation with one of said rotatable discs, said stationary disc terminating peripherally at the free end thereof in spaced relation to said drive shaft, the face of said stationary disc disposed adjacent the ridged and furroughed one face of the rotatable disc being provided with a series of generally radially-extending alternating ridges and furroughs, the boundaries between the ridges and furroughs on said rotatable disc being angularly displaced relative to the boundaries between the ridges and furroughs of said stationary disc;
    said screw means on said drive shaft including a screw section adjacent the peripheral free end of said stationary disc;
    and at least one generally axially extending groove formed in the peripheral free end of each said stationary disc;
    whereby material fed to the inlet of the kneader is advanced sequentially between corresponding faces of rotatable and stationary discs and is subjected alternately to compressive and shearing forces as it is urged circumferentially and radially therebetween.

2. A continuous kneader according to claim 1, including a series of said alternating ridges and furroughs on the other face of said rotatable disc, a second one of said stationary discs depending from said housing in face-to-face relation with said other face of said rotatable disc and having a series of said generally radially-extending alternating ridges and furroughs thereon adjacent said other face of said rotatable disc, the angular relation between the boundaries of the ridges and furroughs on said rotatable disc and on said stationary discs being preselected to cause the material to be urged radially outwardly between said rotatable disc and said one stationary disc, across the outer periphery of said rotatable disc and radially inwardly between said rotatable disc and said second stationary disc.

3. A continuous kneader according to claim 2, wherein the boundaries between the ridges and furroughs on the face of said rotatable disc adjacent the inlet end of the housing extend downwardly and angularly in the direction of rotation of said drive shaft, the boundaries between the ridges and furroughs on the other side of the rotatable disc extending downwardly and at a different angle.

4. A continuous kneader according to claim 2, including projections on the outer periphery of said rotatable disc connecting the ridges on the opposed faces thereof, said projections serving as a pheripher screw adapted to advance the material from said one face to said other face of said rotatable disc.

5. A continuous kneader according to claim 1, including a plurality of cooperable pairs of said rotatable and stationary discs.

6. A continuous kneader according to claim 5 wherein said stationary discs are provided with internal communicating passages and are adapted to pass a heat exchange fluid therethrough.

7. A continuous kneadeer according to claim 6, wherein said drive shaft includes a blind bore therein and said rotatable discs are provided with internal passages in open communication with said blind bore for the passage of a heat exchange fluid therethrough.

8. A continuous kneader according to claim 1, wherein said grooves in the periphery of said stationary discs are wedge-shaped with the depth increasing axially towards the discharge end of the housing.

* * * * *